United States Patent
Nisonen

(10) Patent No.: US 9,312,689 B2
(45) Date of Patent: Apr. 12, 2016

(54) CIRCUIT, METHOD AND SYSTEM FOR OVERLOAD PROTECTION

(71) Applicant: Efore Oyj, Espoo (FI)

(72) Inventor: Ilpo Nisonen, Espoo (FI)

(73) Assignee: EFORE OYJ, Espoo (FI)

( * ) Notice: Subject to any disclaimer, the term of this patent is extended or adjusted under 35 U.S.C. 154(b) by 713 days.

(21) Appl. No.: 13/691,980

(22) Filed: Dec. 3, 2012

(65) Prior Publication Data

US 2013/0140890 A1    Jun. 6, 2013

(30) Foreign Application Priority Data

Dec. 5, 2011   (EP) .................................. 11191873

(51) Int. Cl.
*H02H 9/02* (2006.01)
*H02J 4/00* (2006.01)
*H02H 9/00* (2006.01)

(52) U.S. Cl.
CPC ............... *H02H 9/025* (2013.01); *H02H 9/001* (2013.01); *H02H 9/02* (2013.01); *H02J 4/00* (2013.01); *Y10T 307/352* (2015.04)

(58) Field of Classification Search
CPC ............ H02H 9/025; H02H 9/001; H02J 4/00
USPC ........................................................ 307/131
See application file for complete search history.

(56) References Cited

U.S. PATENT DOCUMENTS

| 5,726,849 A | 3/1998 | Nakamura |
| 6,097,246 A | 8/2000 | Tsurunaga et al. |
| 6,104,106 A | 8/2000 | Partridge |
| 2011/0058397 A1* | 3/2011 | Rizzo .................... H02H 9/001 363/52 |

FOREIGN PATENT DOCUMENTS

| JP | 2002-218755 | 8/2002 |
| JP | 2009-5435 | 1/2009 |
| JP | 2009-38894 | 2/2009 |
| KR | 2000-0039009 | 7/2000 |

OTHER PUBLICATIONS

European Search Report dated Apr. 25, 2012, corresponding to the Foreign Priority Application No. 11 19 1873.

* cited by examiner

*Primary Examiner* — Scott Bauer
(74) *Attorney, Agent, or Firm* — Young & Thompson

(57) ABSTRACT

An overload protection circuit for supplying electric power has advantageous applications especially in supplying power to capacitive loads. In prior art circuits, the charging current is lead to the capacitive load through a linearly operating transistor or through a power resistor. Therefore, prior art circuits often involve a risk of exceeding safe operating area of a power transistor, or circuits with a large number of components are needed. The present overload protection circuit has an inductor (L) coupled in series with a switching element (Q). Load current is measured (35, 38), and the switching element (Q) is controlled (35, 36) to supply current to the load via the inductor (L) until a determined current limit is achieved. After achieving the current limit the switching element (Q) is controlled to off-state, during which the freewheeling current of the inductor (L) is lead through a voltage dependent element (Z).

14 Claims, 6 Drawing Sheets

CIRCUIT, METHOD AND SYSTEM FOR OVERLOAD PROTECTION

FIELD OF INVENTION

The present invention relates generally to overload protection in supply of electric power. More specifically, the present invention relates to subject matter disclosed below and recited in the claims. The invention has advantageous applications especially in supplying power to capacitive loads.

BACKGROUND

Power supplies, such as switching power supplies, are used for providing direct current (DC) supply for various electronic devices, such as base stations in a cellular communications system. For a power supply, an electronic device is a load which often includes a capacitive load component. When power with a specified operating voltage is connected to such a load, a high current is initially formed for charging the capacitive load component. Such a high current may exceed the current output rating of the power supply, and this may cause power components of the power supply to get damaged. Another cause for excessively high load current may be a short circuit or other fault in the load. It is also possible that the load does not match with the power supply ratings. In order to protect a power supply in such situations overload protection circuits are used. These circuits limit and/or disconnect the current supplied to the load in situations where excessive current values are detected at the output of the power supply.

FIG. 1 illustrates an overload protection circuit according to prior art. The circuit is connected between the power output line $-V_{SUPPLY}$ of a power supply and power input line $-V_{LOAD}$ of the load. R is used in the Figure to denote resistive part of the load and C is used to denote capacitive part of the load. The circuit has a switching element Q, such as a FET transistor, and a control unit 15 for controlling the gate of the transistor and thus current supply to the load. The control unit monitors the supply current with a current sensor 18. When the transistor is switched-on the supply current flows to the load through the transistor. When the current exceeds a predetermined limit the output 16 of the control unit controls the transistor to reduce the current. The transistor Q is thus also used for linear control of the supply current.

However, this solution of the prior art has a certain disadvantage. transistors cannot dissipate high power for long periods without exceeding safe operating area (SOA) of the transistor. If the SOA of the transistor is exceeded there is a risk of the transistor becoming damaged. The reliability of the device may thus be degraded. As a further disadvantage, providing linear control of the switching transistor requires a more complicated structure of the control circuit. There is also a potential risk of instability related to such a linear control.

FIG. 2 illustrates another overload protection circuit according to prior art. This circuit has a first switching element Q1 between the power supply and the load. The overload protection circuit also has a second switching element Q2, which is connected in series with a power resistor R1. The switching elements are controlled by a control circuit 25. When the power is switched ON to the load the second switching element is first switched ON by the control line 27, allowing the current to flow through the second switching element Q2 and the power resistor R1. The current is limited by the resistor in order to avoid an excessive value of current. After the load capacitance has been initially charged the first switching element is switched ON by the control line 26, allowing the current to flow directly through the first switching element to the load. There may be, for example, a fixed delay arranged between switching ON the second and first switching elements.

There are certain disadvantages also concerning the prior art overload protection circuit according to FIG. 2. Firstly, the load voltage does not reach the nominal value when the current is supplied through the resistor R1. Therefore it is possible that a high charging current still exists when the first switching transistor is switched ON.

Secondly, the power resistor may dissipate a large amount of energy during the power start-up. Therefore, the power resistor must have a high power rating. Such a power resistor has large dimensions and thus requires much space. It is also a relatively expensive component, thus increasing the production cost of the device. The required resistance and power ratings of the power resistor also depend on the requirements of the power supply and load. Therefore, it may be necessary to provide several versions of overload protection circuits with different components.

The circuit of FIG. 2 also requires two power switching elements and corresponding control circuits for both elements. This further increases the complexity and production cost of the device.

In electronic systems, such as communication systems, it is often necessary to supply power of various voltages to several devices of the system. An overload protection circuit is needed for each supply connection, and the required number of the overload protection circuits may therefore be high. It is often also necessary to have different properties of overload protection circuits for different load devices and different supply inputs of each device. Further, it is important that the reliability of the overload protection circuits is high because a failure may cause large part of an electronic system to become inoperative. As described above, the overload protection circuits according to the prior art do not fulfil these requirements in a desirable manner.

SUMMARY OF THE INVENTION

It is an object of the present invention to provide an overload protection circuit for various applications, wherein the described disadvantages of the prior art are avoided or reduced. The object of the invention is therefore to achieve overload protection which has high reliability, which can be implemented with moderate production cost, and which can be adapted for versatile requirements of power supplies and loads.

The object of the invention is achieved by providing an overload protection circuit which has an inductor coupled in series with a switching element. The switching element is controlled to supply current to the load via the inductor until a determined current limit is achieved. After achieving the current limit the switching element is controlled to off-state, after which the freewheeling current of the inductor is lead through a voltage dependent element which is coupled in parallel with the switching element.

More specifically, the object of the invention is achieved by providing an electrical circuit for overload protection between a power supply and a load, the circuit comprising
   a controllable switching element connected in series between the power supply output and the load input,
   a sensor for directly or indirectly measuring current of the switching element;
   control means for controlling the switching element on the basis of the measured current, which circuit is characterized in that the overload protection further comprises
  an inductor connected in series with the switching element, and
  a voltage dependent element connected in parallel with the switching element,
wherein
  the control means are adapted to switch OFF the switching element when the measured current is higher than a determined trigger threshold value, and
  during the OFF state of the switching element current of the inductor is arranged to flow through the voltage dependent element.

The invention also relates to a method for providing overload protection for a power supply, wherein
  current is led from a power supply to a load through a controllable switching element,
  the current of the switching element is measured, and the switching element is controlled on the basis of the measured current,
the method being characterized in that
  the supply current is also led through an inductor, which is connected in series with the switching element,
  a trigger threshold value is stored in control means,
  the measured current of the switching element is compared with the trigger threshold value,
  when the current value exceeds the threshold value the switching element is switched OFF,
  after switching OFF the switching element load current is led through a voltage dependent element, which is connected in parallel with the switching element.

The invention further relates to a system for supplying electrical power to loads, wherein the system has one or several power supplies with power outputs supplying power to the power inputs of the loads, and overload protection circuits connected between a plurality of the power supply outputs and the load inputs, and the system is characterized in that at least one of the overload protection circuits is a circuit according to the present invention.

According to one embodiment of the invention the switching element is switched ON after a predetermined delay has passed after switching OFF the switching element due to the exceeding of the trigger threshold value. The cycle of switching the switching element ON and OFF may be repeated many times, as long as the charging current exceeds the trigger threshold value. The delay may be fixed, programmable or controllable, for example. A variable delay may be determined through hysteresis control, adaptive control, etc.

According to one further embodiment of the invention the overload protection circuit has also tripping functionality for switching OFF the power in case of continuous overload situations, for example. In the tripping function current level values and corresponding trip threshold time lengths are stored in the control means. The current of the switching element is measured, and the time of exceeding stored current levels within a time window is monitored. If the trip threshold time is exceeded in relation to any current level the switching element is switched OFF by the control means.

According to one further embodiment of the invention the trigger threshold data and/or trip data is stored in control means through an interface of the circuit. The data can be stored prior, during or after installation of the overload protection circuit, and the data can be determined according to the requirements of the power supply output and the load input. In one embodiment of the invention the interface of the circuit is also used for acquiring data relating to the operation status and/or history of the overload protection circuit.

In one further embodiment of the invention the overload protection circuit also includes means for measuring the voltage received from the power supply or the voltage supplied to the load. The measured voltage information may be used in the control of the switching element. The measured voltage value may also be compared with stored information on allowed voltage range, and if a measured voltage value is outside the allowed range the control means may switch OFF the power.

In one further embodiment of the invention the overload protection circuit also includes means for measuring ambient temperature and/or component temperature of the overload protection circuit. The measured temperature values may be compared with stored information on allowed temperature ranges, and if a measured temperature value is outside the allowed range the control means may switch OFF the power.

Some preferable embodiments of the present invention are described in dependent claims.

The present invention has substantial advantages over prior art solutions. The switching element of the circuit is not used for linear control of the current. Therefore, the power dissipation in the switching element is small. Also, the individual periods of power dissipation in the voltage dependent element are short. It is therefore feasible to provide an overload protection circuit in which power components operate in safe operating area. As a consequence, it is possible to achieve high reliability of the overload protection circuit as well as the power supply.

The control unit of the circuit can be programmed for an optimal switching as a function of threshold currents, delays, and/or voltages. It is not necessary to have several versions of overload protection circuits with different components, but the same circuit is applicable with large range of power supplies and loads with different requirements.

The overload circuit according to the present invention can be implemented with a small number of power components and control components, whereby the circuit can be economically produced.

BRIEF DESCRIPTION OF THE DRAWINGS

The described and other advantages of the invention will become apparent from the following detailed description and by referring to the enclosed drawings where.

DETAILED DESCRIPTION

Figure 1:
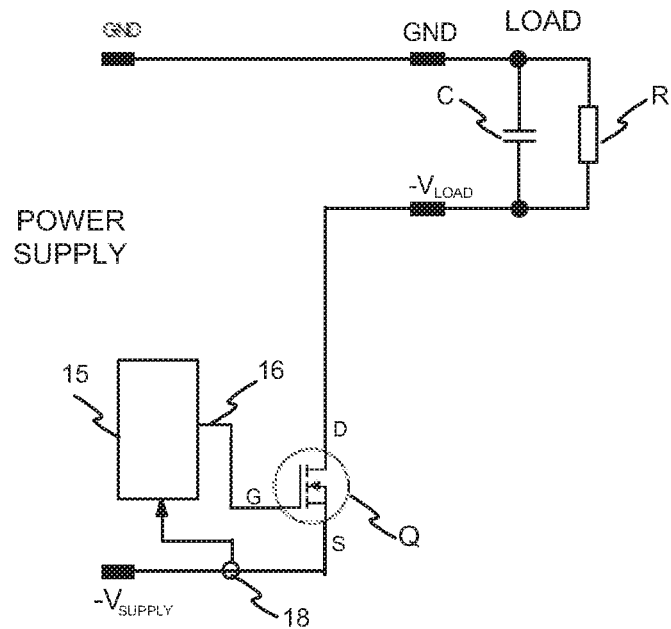
FIG. 1 illustrates an overload protection circuit according to prior art.
Figure 2:
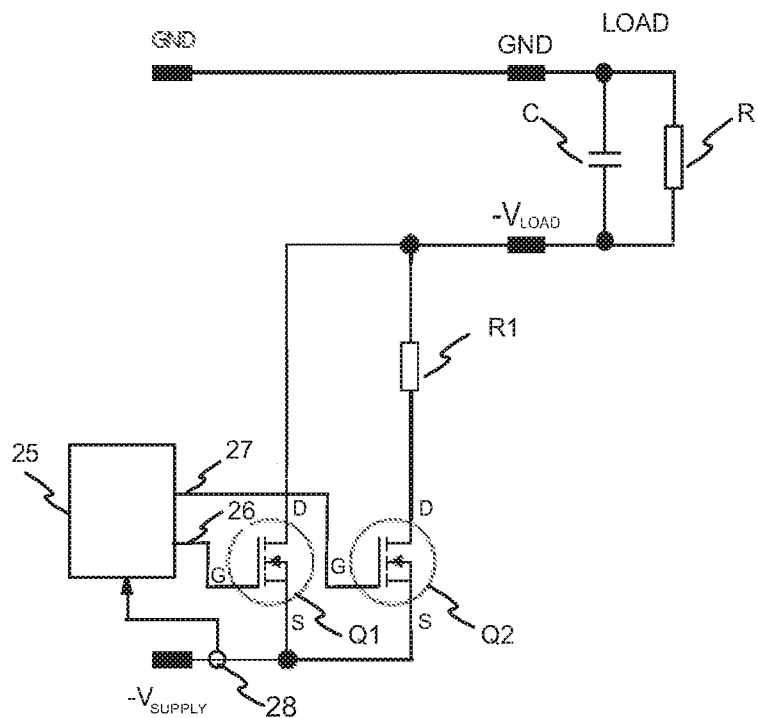
FIG. 2 illustrates another overload protection circuit according to prior art.

FIGS. 1 and 2 where described on the prior art part of the description.

Figure 3:
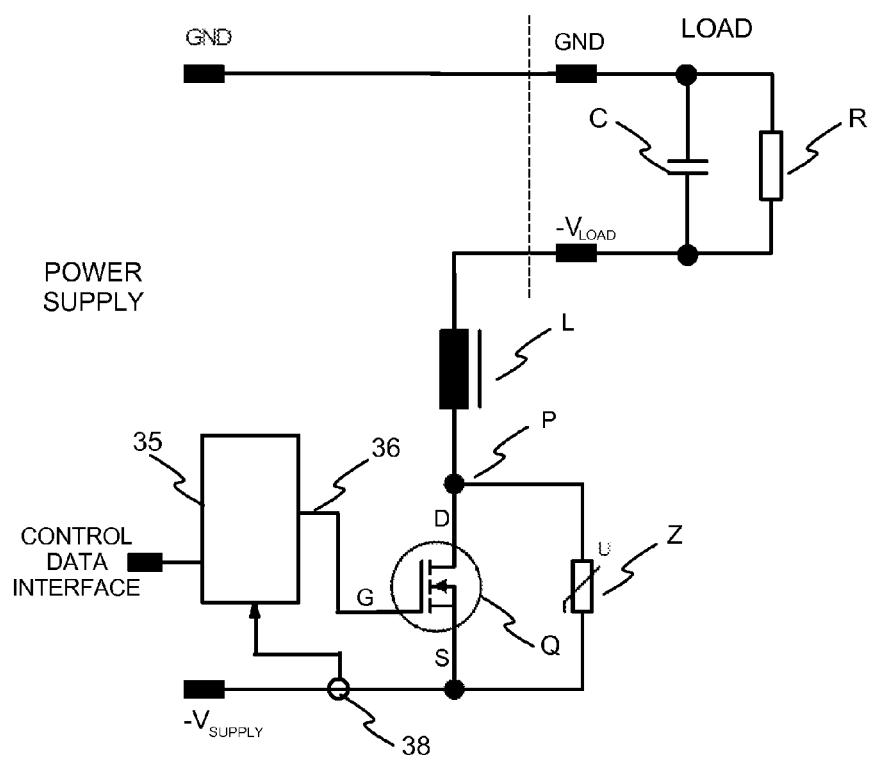
FIG. 3 illustrates an exemplary overload protection circuit according to the invention.

FIG. 3 illustrates an exemplary overload protection circuit according to the invention. A power supply provides an output voltage between ground GND and negative voltage output $-V_{SUPPLY}$ terminals. The power supply provides power to a load which has terminals for ground GND and negative voltage input $-V_{LOAD}$. R is used in the Figure to denote resistive load and C is used to denote capacitive load.

The overload protection circuit has a switching element Q, which may be a power semiconductor, such as MOSFET or an IGBT, for example. The switching transistor is controlled with control means 35, which has a control output 36 connected to the gate G of the switching transistor. The overload protection circuit has an inductor L connected in series with the switching element Q. In the circuit of FIG. 3 the source S of the switching element is connected to the negative terminal $-V_{SUPPLY}$ of the power supply, the drain D of the switching element is connected to a first terminal of the inductor L, and the second terminal of the inductor L is connected to the negative input terminal $-V_{LOAD}$ of the load. When the switching element Q is in conducting state (switched-on), supply current flows through the switching element and the inductor to the load.

The circuit also has a voltage dependent element Z, whose current is a non-linear function of the voltage across the element. The voltage dependent element can be implemented with a metal oxide varistor, for example. When the voltage across the voltage dependent element is small the current through the element is small and negligible to the function of the circuit. When the voltage across the voltage dependent element exceeds a clamping voltage u of the element the current of the element rapidly rises. The voltage dependent element is connected in parallel with the switching element Q, to its source S and drain D terminals. The voltage dependent element thus prevents the voltage across the switching element from rising much above the clamping voltage of the voltage dependent element. The clamping voltage is selected to be substantially lower than the breakdown voltage of the switching element, and thereby the voltage dependent element protects the switching element from overvoltage. Although a varistor is suitable as a voltage dependent element, also other types of fast components with a clamping voltage can be used, such as zener diodes or other voltage suppression components.

The overload protection circuit has a current sensor 38 for measuring the current supplied to load. The current sensor may locate at source or drain terminal of the switching element, or it may locate at the $-V_{SUPPLY}$ lead between the power supply and the overload protection circuit, or at the $-V_{LOAD}$ lead between the overload protection circuit and the load. However, the load current may alternatively be measured in some other point(s), such as the ground lead between the power supply and the load.

The current sensor 38 is connected to the control means 35, which uses the information on the sensed current value in controlling the switching element Q. The control means 35 can be implemented with a processor, such as a microcontroller, and suitable input/output interface circuits.

Figure 4A:
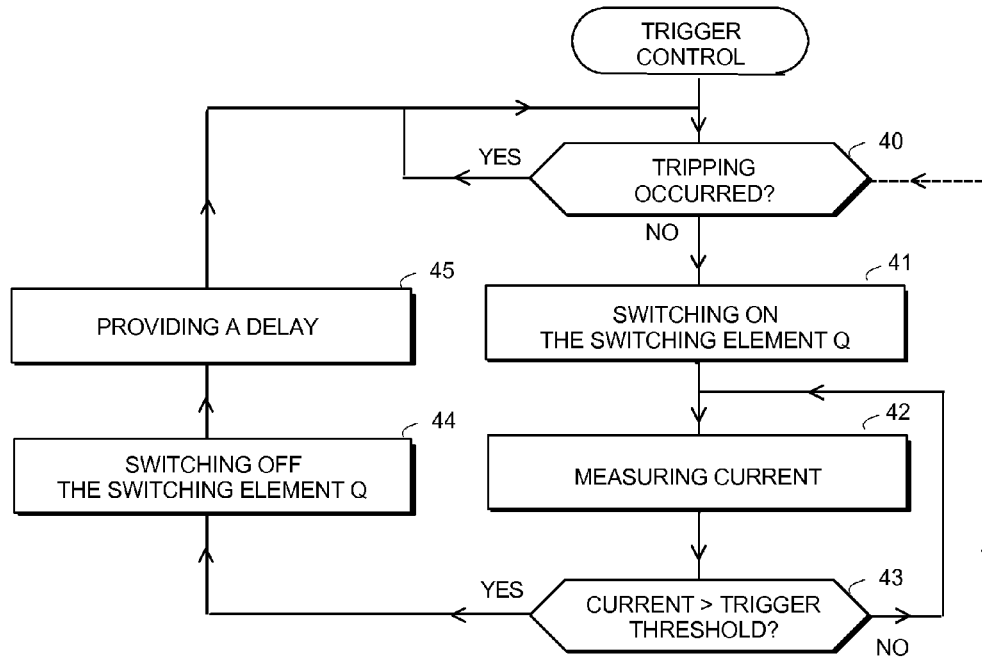
FIG. 4a illustrates a flow diagram of an exemplary method for providing overload protection by using trigger threshold control.

The operation of the circuit of FIG. 3 is next described with further reference to FIGS. 4a, 4b, 5a and 5b. FIG. 4a illustrates a flow diagram of an exemplary method for providing overload protection by using trigger threshold control. First in phase 40 it is checked that the overload protection circuit is not in a tripped state due to exceeding a maximum load current. The information on the tripping status is received from trip control process of the circuit. If tripping has occurred the trigger control function is halted until the tripping status is reset to normal.

In phase 41 the switching element Q is switched ON. It is possible that the load is continuously connected to the overload protection circuit, whereby the supply voltage is applied to the load when the switching element is switched ON. Alternatively the load may include a separate power switch, which connects the load to the overload protection circuit.

In phase 42 the supply current is measured with a current sensor 38. The control means 35 receives the sensor signal and converts the signal into measured current value. The control means further compares the measured current value with a predetermined trigger threshold value in phase 43. If the load has a substantial capacitive load component, the measured current value may exceed the trigger threshold value, and the switching element is switched OFF in phase 44. When the switching element is switched OFF the current continues flowing through the inductor L due to the inductive energy stored in the inductor. This causes the voltage to rise at the inductor terminal, which is connected to the switching element and the voltage dependent element in point P. The voltage across the voltage dependent element Z reaches the clamping voltage, after which the load current starts flowing through the voltage dependent element Z.

The switching element Q is kept in off-state for a predetermined period. This is implemented by applying a predetermined delay in phase 45, after which the control process returns to phase 40 in order to check if tripping has occurred. Phases 40-45 are repeated as long as the measured current exceeds the trigger threshold value in phase 43 or the overload protection circuit trips. The delay may be fixed, programmable or controllable, for example. A variable delay may be determined through hysteresis control, adaptive control, etc.

Figure 5A:
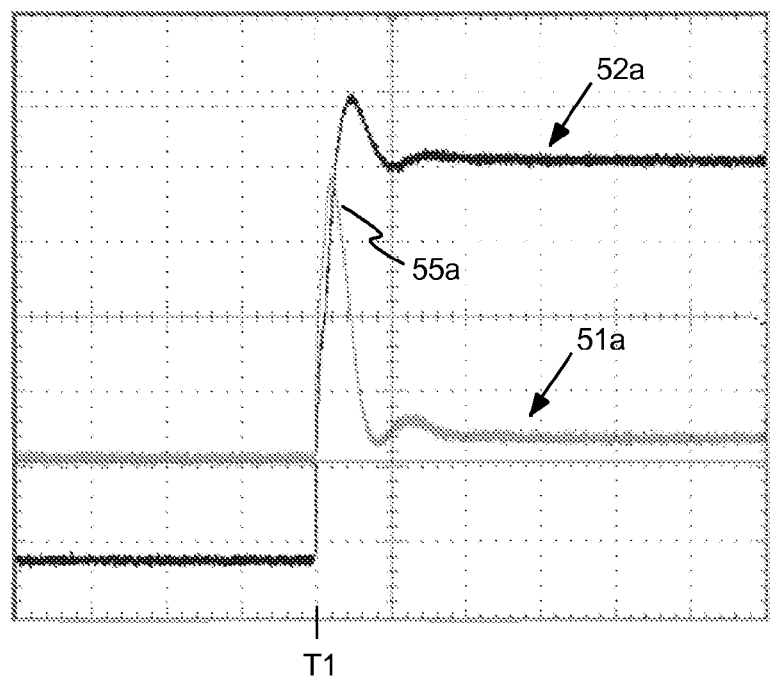
FIG. 5a illustrates transistor voltage and current during charging of a small load capacitance in an exemplary overload protection circuit according to the invention.
Figure 5B:
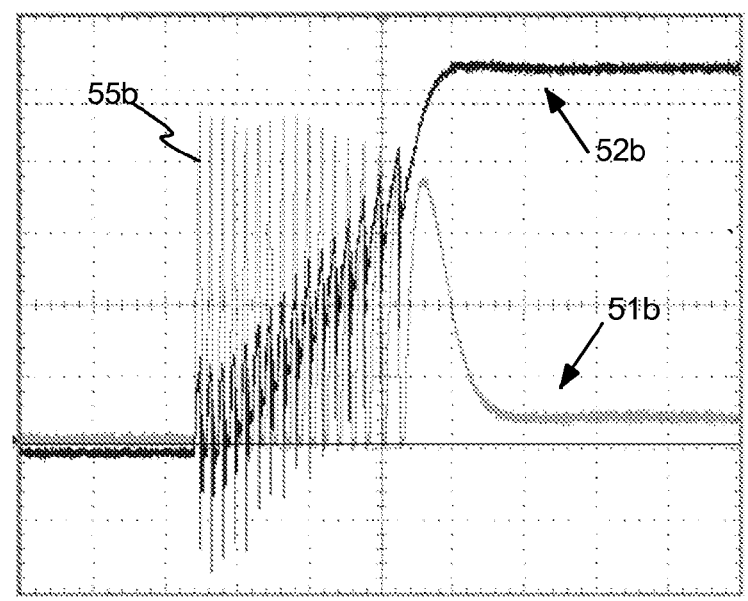
FIG. 5b illustrates transistor voltage and current during charging of a large load capacitance in an exemplary overload protection circuit according to the invention.

FIGS. 5a and 5b illustrate exemplary graphs of current and voltage (vertical axis) as a function of time (horizontal axis) during the charging of the load capacitance. FIG. 5a illustrates a graph 51a of the current flowing through the switching element and a graph 52a of the voltage at the connection point P of the switching transistor Q, inductor and the voltage dependent element Z. FIG. 5a illustrates a situation where the load capacitance is small, such as 25 μF. The peak current 55a which is required for charging the load capacitance does not exceed the trigger threshold value, and therefore the switching element is not switched OFF during the charging.

FIG. 5b illustrates a situation where the load capacitance is large, such as 1000 μF. FIG. 5b illustrates a graph 51b of the current flowing through the switching element and a graph 52b of the voltage at the load. Due to the large load capacitance the current exceeds the trigger threshold value at point 55b, and the switching element is therefore switched OFF. The procedure of switching the switching element ON and OFF is repeated for several times until the load capacitance is charged, after which the load current stabilizes to its nominal value.

Figure 4B:
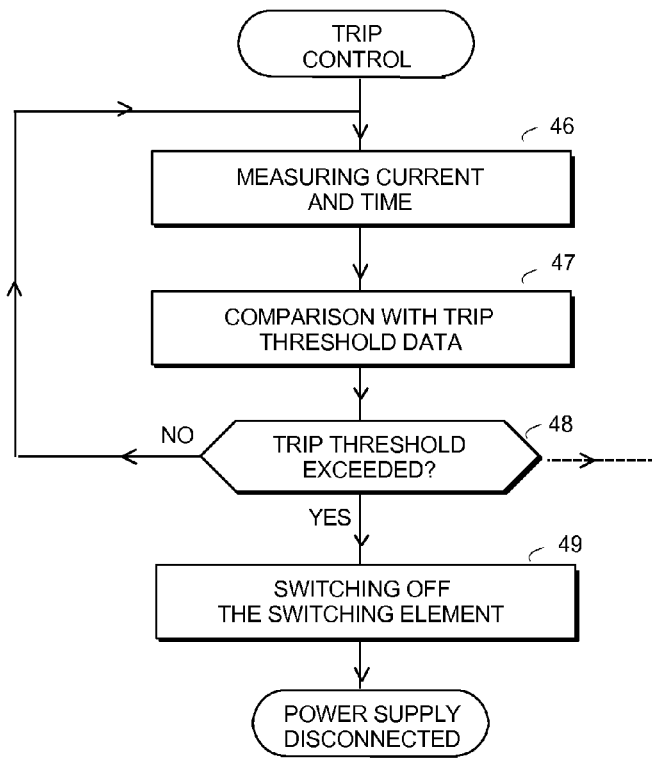
FIG. 4b illustrates a flow diagram of an exemplary method for implementing trip control in a overload protection circuit according to the invention.

FIG. 4b illustrates a flow diagram of an exemplary method for implementing trip control in a overload protection circuit according to the invention. Initially it is determined which current steps are monitored and which are the time lengths used as tripping thresholds. The current of the switching element is then measured in phase 46. Same current measurement can be used for trip control as is used for the trigger control.

When the current exceeds a current step, it is then monitored how long time the exceeding of the current step occurs within a specified time window, for example. In step 48 it is checked whether said time length exceeds the time threshold which is defined for the monitored current step. If a time threshold is not exceeded the current measurement and time measurement continues. If the time threshold is exceeded the switching element is switched OFF by the control means 35 in phase 49, which means that the overload protection circuit trips. The information on the trip status is also used in trigger control in order to prevent switching ON the switching element in case of tripping.

Exceeding the trip threshold means that an overload situation has occurred, and this may damage the power supply if the supplying of power is continued. Therefore, the switching element is not automatically switched back ON. It may be necessary, for example, to reset the tripping status at the control means in order switch ON the power to the load again after tripping.

It should be noted that there are several possibilities to implement the trip monitoring. The number of current steps may be e.g. six, but it may alternatively be lower or higher. The sampling time in current measurement may be e.g. 1 ms, but it may alternatively be lower or higher. These parameters may be programmable.

It is preferable to apply a measurement time window for trip monitoring. Such a time window may have a length of one second, for example. The exceeding of monitored current levels during the time window is then recorded and cumulated. If a time threshold for any current level is exceeded within the time window the switching element is switched OFF, i.e. tripped. After a time window is over, the recorded time values of exceeding current levels are reset, and the new time window can be started with zero cumulated time values of exceeded current levels. A new time window may start when a current level is next exceeded. It is also possible that time windows are automatically repeated.

As an alternative, it is possible to apply a sliding time window. In this case, the recorded time lengths of exceeding current levels are cumulated from the data recorded within latest time window. This procedure is more accurate, but it requires more efficient data processing.

The processes of trigger monitoring and trip monitoring were described above as parallel processes. As an alternative, it is also possible to have an implementation where the processes are sequential.

Figure 6:
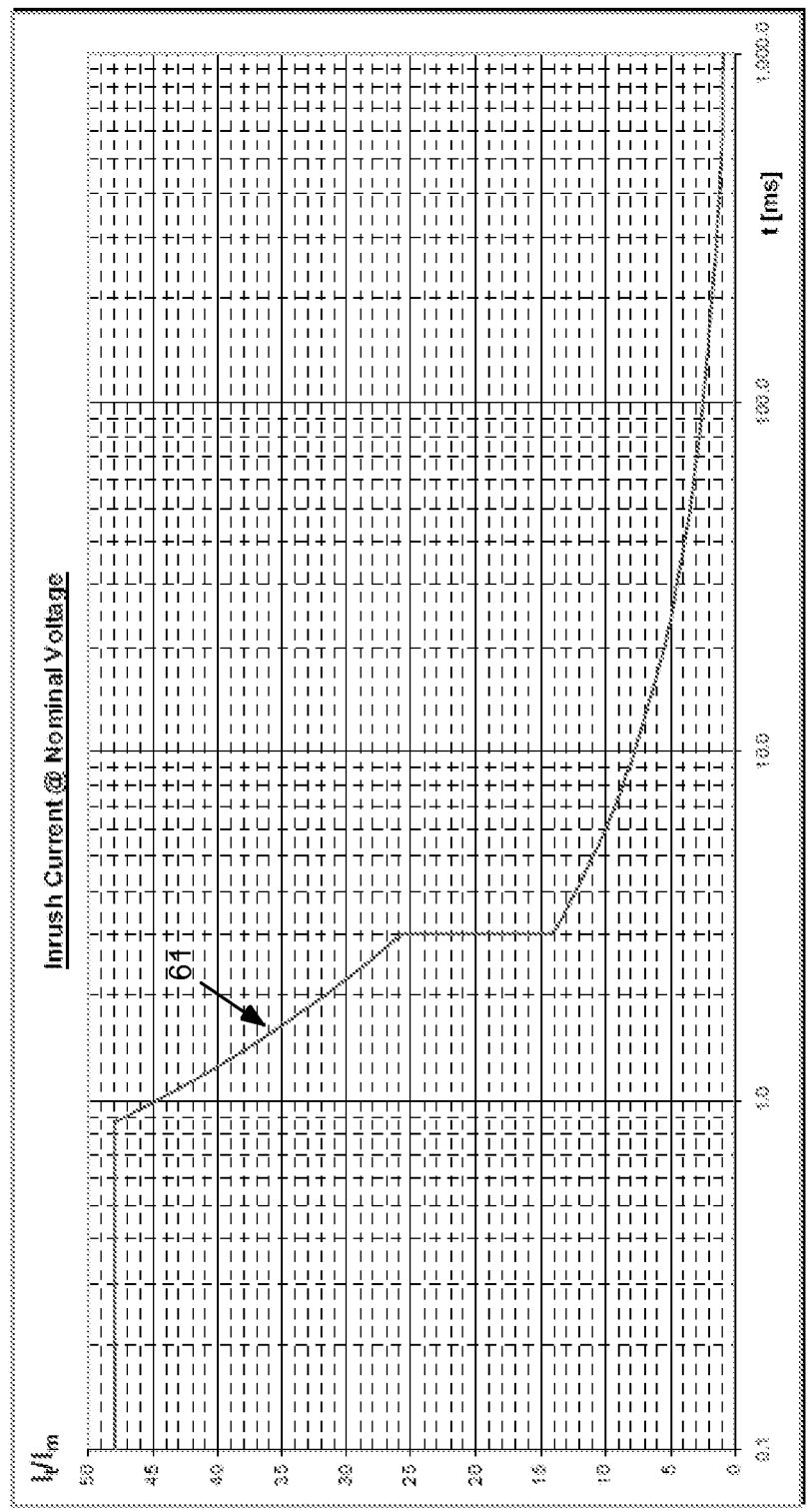
FIG. 6 illustrates a graph of maximum time lengths as a function of current levels.

FIG. 6 illustrates an exemplary graph 61 of maximum time lengths as a function of current values. The horizontal axis denotes time length and the vertical axis denotes ratio between instantaneous current value and the rated nominal current value of a power supply. The graph of FIG. 6 is determined by ETSI (European Telecommunications Standards Institute) standard EN 300 132-2. The graph shows the maximum inrush current for telecommunications equipment at nominal voltage and maximum load. In order to avoid exceeding the values of the graph, it is preferable to use smaller time length values for trip thresholds than shown in the graph. The difference between the time values of the graph and the trip threshold values of the overload protection device depend on the current measurement accuracy, timing resolution etc. of the overload protection device.

Figure 7:
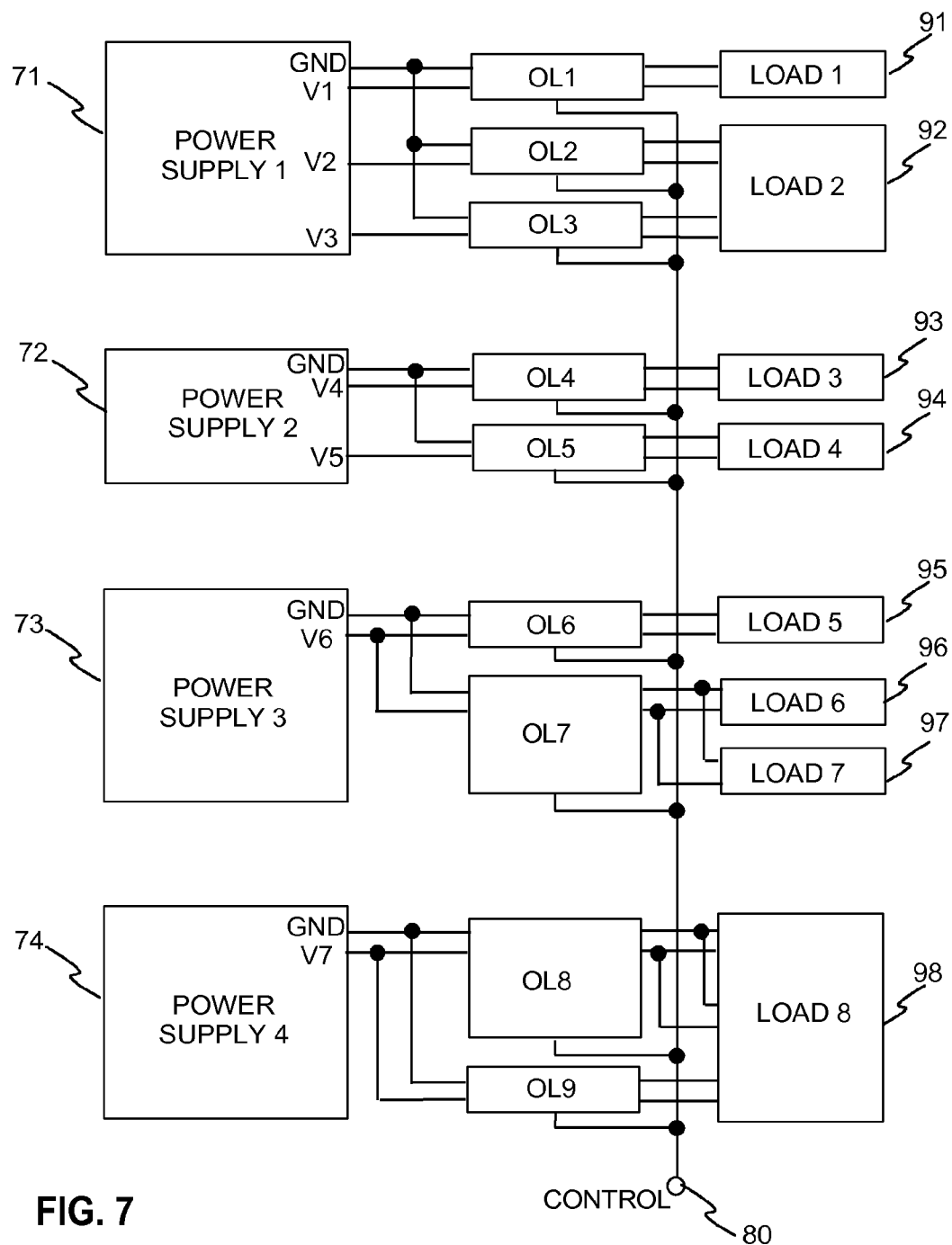
FIG. 7 illustrates a block diagram of an exemplary power supply system, which includes a plurality of overload protection circuits according to the invention.

FIG. 7 illustrates an exemplary system for supplying power to eight loads, 91-98. The loads 91 and 93-97 have one power input, the load 92 has two power inputs, and the load 98 has three power inputs. The system has a first power supply 71, which has three outputs V1, V2 and V3. The first power supply provides power for the loads 91 and 92. A second power supply 72 has two outputs V4 and V5. The second power supply provides power for the loads 93 and 94. The third power supply 73 has one power output V6, which provides power for three loads 95, 96, and 97. The fourth power supply 74 has one output, which provides power for three power inputs of a single load 98. Each six power connections of loads 91-95 each have an individual overload protection circuit OL1-OL6. Loads 96 and 97 have a common overload protection circuit OL7. Load 98 has one overload protection circuit OL8 for two power inputs and another overload protection circuit OL9 for a third power input.

It should be noted that the number of power supplies, overload protection circuits or loads in a system is not in any way limited to the mentioned numbers. A system may thus have one or several power supplies, and a power supply may have one or several power outputs. One overload protection device may receive power from one or several outputs of one or several power supplies. One overload protection circuit may provide power for one or several loads, and a load may have one or several power inputs. And further, one load may receive power from one or several overload protection circuits. It is preferable that the inputs and outputs of the overload protection circuits have a common ground.

The overload protection circuits can be programmed with e.g. a serial or parallel control interface 80. The overload protection circuits may have individual addresses for individual control. It is also possible that wired or wireless data transfer is arranged for remote control of the overload protection circuits. The control input data may include e.g. trigger threshold values, delay values and tripping threshold data. The control output data may include e.g. status and history information concerning the operation of the overload protection circuits. It is also possible to use the remote control for turning the device ON/OFF, for example.

The overload protection circuits can be initially programmed during production, and/or they can be programmed locally during installation and maintenance, and/or they can be programmed remotely from a central control facility, for example. The overload protection circuits may send history, status and measurement information to such a remote control center. It is also possible that the overload protection circuits transfer their status and other possible information to the processors of the power supplies which they are connected to. This way a power supply may switch OFF, for example, if an overload protection circuit at its output has tripped.

In this patent specification the structure of the other various components of an overprotection circuit is not described in more detail as they can be implemented using the description above and the general knowledge of a person skilled in the art. Each of the elements such as the switching element, the inductor and the voltage dependent element, can include one component or it may consist of two or several components. The component types have been mentioned as examples, and a person skilled can think of several alternative component types providing the functionalities described above.

The control functions of the overload protection circuit can be implemented with analogue circuits, such as an ASIC circuit, whereby a simple implementation would be achieved. However, to achieve a more advanced functionality, a digital implementation is preferred. When a microcontroller/processor is used the circuit requires a suitable processor program, which is executed in a device. To convert a known device or system into equipment according to the invention it is necessary, in addition to the hardware modifications, to store into the memory means a set of machine-readable instructions that instruct the microprocessor(s) to perform the functions described above. Composing and storing into memory of such instructions involves known technology which, when combined with the teachings of this patent application, is within the capabilities of a person skilled in the art.

Above, only some embodiments of the solution according to the invention have been described. The principle according to the invention can naturally be modified within the frame of the scope defined by the claims, for example, by modification of the details of the implementation and ranges of use.

For example, embodiments described above has included a digital, microcontroller based controlling of trigger and trip functions. However, as an alternative it is also possible to use analogue circuits with suitable filters, for example, for implementing the trigger and/or trip functions.

Although the invention has been described with embodiments where the load has a capacitive load component it is clear that the overload protection circuit according to the present invention is applicable to loads with any load impedance.

The present invention can be applied in DC power supplies for various purposes, such as telecommunication systems, electric car applications, solar panels etc.

The invention claimed is:

1. Electrical circuit for overload protection between a power supply and a load, the circuit comprising:
    a controllable switching element (Q) connected in series between the power supply output (−VSUPPLY) and the load input (−VLOAD),
    a sensor (38) for directly or indirectly measuring current of the switching element;
    control means (35) for controlling the switching element on the basis of the measured current,
    an inductor (L) connected in series with the switching element, and
    a voltage dependent element (Z) with a clamping voltage connected in parallel with the switching element, wherein,
    the control means (35) are adapted to switch OFF the switching element (Q) when the measured current is higher than a determined trigger threshold value,
    during the OFF state of the switching element current of the inductor (L) is arranged to flow through the voltage dependent element (Z),
    the control means include stored data comprising current level values and a respective corresponding value of trip threshold time length for each of the current level values, and
    the control means are adapted to monitor and determine, within a predetermined time window, whether a time period that the current passing through the switching element (Q) exceeds the trip threshold time length corresponding to any of the current level values.

2. The overload protection circuit according to claim 1, characterized in that the control means are adapted to switch ON the switching element after a delay has passed after switching OFF the switching element due to the exceeding of the trigger threshold value.

3. The overload protection circuit according to claim 1, characterized in that the voltage dependent element (Z) is a metal oxide varistor.

4. The overload protection circuit according to claim 1, characterized in that the switching element (Q) comprises at least one power semiconductor.

5. The overload protection circuit according to claim 1, characterized in that the control means (35) comprises a programmable microcontroller.

6. The overload protection circuit according to claim 1, characterized in that the control means are adapted to switch OFF the switching element when the control means determines, within the predetermined time window, that the time period that the current has passes through the switching element (Q) exceeds the trip threshold time length corresponding to at least one of the current level values.

7. The overload protection circuit according to claim 1, characterized in that the control means (35) have an interface for transferring trigger data, trip data and/or program data for storing in the control means and/or for remote control of the circuit and/or for monitoring parameters of the circuit.

8. A method for providing overload protection for a power supply, wherein
    current is led from a power supply to a load through a controllable switching element (Q),
    the current of the switching element is measured (42), and the switching element is controlled on the basis of the measured current,
    the supply current is also led through an inductor (L), which is connected in series with the switching element,
    a trigger threshold value is stored in control means (35),
    the measured current of the switching element is compared with the trigger threshold value,
    when the current value exceeds the threshold value (43) the switching element is switched OFF (44),
    after switching OFF the switching element load current is led through a voltage dependent element (Z) with a clamping voltage, which voltage dependent element is connected in parallel with the switching element,
    wherein current level values and corresponding values of trip threshold time lengths are stored, and the time of exceeding each current level is monitored, and exceeding the trip threshold time length, within a predetermined time window, for any of the stored current level values is detected.

9. The method according to claim 8, characterized in that the switching element is switched-ON after a delay has passed (45) after switching OFF the switching element due to the exceeding of the trigger threshold value (44).

10. The method according to claim 8, characterized in that the switching element is switched OFF if the trip threshold time length is exceeded within a predetermined time window.

11. The method according to claim 8, characterized in that the threshold data, trip data and/or program data is transferred to the control means.

12. A system for supplying electrical power to one or several loads, wherein the system has one or several power supplies with power outputs supplying power to the power inputs of the load(s), and one or several overload protection circuits connected between a plurality of the power supply outputs and the load inputs, characterized in that at least one of the overload protection circuits is a circuit according to claim 1.

13. The system according to claim 12, characterized in that the system comprises a plurality of overload protection circuits, and the overload protection circuits have individual trigger threshold data and/or trip threshold data based on the requirements of individual power supply outputs and load inputs.

14. A method for providing overload protection for a power supply, the method comprising the steps of:

providing current from a power supply to a load through a controllable switching element (Q) and through an inductor (L), connected in series with the controllable switching element (Q);

storing a trigger threshold value (43) in a memory of a control unit (35);

storing current level values and corresponding values of trip threshold time lengths in the memory of a control unit (35) so as to have at least i) a first current level value and a corresponding first trip threshold time length, and ii) a second current level value and a corresponding second trip threshold time length, the second current level value being greater than the first current level value and the second trip threshold time length being shorter than the first trip threshold time length;

measuring the current passing through the controllable switching element (Q);

with the control unit, controlling the controllable switching element (Q) based on the measured current passing through the controllable switching element (Q), said controlling step including i) comparing a) the measured current passing through the controllable switching element (Q) with b) the trigger threshold value, ii) when the comparing step determines that a) the current passing through the controllable switching element (Q) exceeds b) the trigger threshold value (43), the control unit switching the controllable switching element (Q) OFF (44), iii) after the step of switching the controllable switching element (Q) OFF (44), passing the current through the voltage dependent element (Z) with a clamping voltage, the voltage dependent element being connected in parallel with the controllable switching element (Q), and iv) within each of plural predetermined time windows, monitoring a time period that the current through the controllable switching element (Q) exceeds each one of the stored current levels, and when the monitored time period exceeds the respective threshold time length for any one of the stored current levels, the control unit switching the controllable switching element (Q) OFF (48), wherein, within each said predetermined time window, when the monitored current through the controllable switching element (Q) exceeds the first current level value for the first trip threshold time length, the control unit switches the controllable switching element (Q) OFF (48), and wherein, within each said predetermined time window, when the controllable switching element (Q) exceeds the second current level value and the corresponding second trip threshold time length, the control unit switches the controllable switching element (Q) OFF (48).

* * * * *